United States Patent
Andreasson et al.

(10) Patent No.: US 12,122,388 B2
(45) Date of Patent: Oct. 22, 2024

(54) CONTROLLING APPARATUS FOR A POWERTRAIN OF AN ELECTRIC VEHICLE

(71) Applicant: VOLVO TRUCK CORPORATION, Gothenburg (SE)

(72) Inventors: Mattias Andreasson, Gothenburg (SE); Erik Lauri, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/044,718

(22) PCT Filed: Sep. 17, 2021

(86) PCT No.: PCT/EP2021/075678
§ 371 (c)(1),
(2) Date: Mar. 9, 2023

(87) PCT Pub. No.: WO2022/058532
PCT Pub. Date: Mar. 24, 2022

(65) Prior Publication Data
US 2023/0406319 A1   Dec. 21, 2023

(30) Foreign Application Priority Data
Sep. 18, 2020 (EP) .................... 20196922

(51) Int. Cl.
*B60W 30/19* (2012.01)
*B60K 1/02* (2006.01)
(Continued)

(52) U.S. Cl.
CPC .............. *B60W 30/19* (2013.01); *B60K 1/02* (2013.01); *B60W 10/02* (2013.01); *B60W 10/08* (2013.01);
(Continued)

(58) Field of Classification Search
CPC ......... B60W 2510/1015; B60W 10/08; B60W 2710/021
See application file for complete search history.

(56) References Cited

U.S. PATENT DOCUMENTS

| | | |
|---|---|---|
| 6,364,806 B1 | 4/2002 | Spaniel |
| 10,744,889 B1 | 8/2020 | Rippelmeyer et al. |
| (Continued) | | |

FOREIGN PATENT DOCUMENTS

| | | |
|---|---|---|
| DE | 102018210329 A1 | 1/2020 |
| EP | 3388274 A1 | 10/2018 |
| WO | 2010133155 A1 | 11/2010 |

OTHER PUBLICATIONS

Extended European Search Report in corresponding European Application No. 20196922.7 dated Mar. 17, 2021 (8 pages).
(Continued)

*Primary Examiner* — Derek D Knight
(74) *Attorney, Agent, or Firm* — Venable LLPP; Jeffri A. Kaminski

(57) ABSTRACT

The present invention relates to a controlling apparatus for a powertrain of an electric vehicle, wherein the electric vehicle comprises a gearbox having an input shaft, a first electric machine and a second electric machine being coupled to the input shaft of the gearbox. The controlling apparatus is configured to control the operation of the first and second electric machines by the steps of:
  changing the speed of the first and second electric machines to reach a target speed of the input shaft;
  determining that the speed of the input shaft is within a target range of the target speed;
  setting one of the first and second electric machines in a first control mode, the first control mode being speed control to adjust for changes so that the target speed of the input shaft can be kept when reached, and setting
(Continued)

the other one of the first and second electric machines in a second control mode being different to the first control mode, in response of determining that the speed of the input shaft is within the target range.

19 Claims, 3 Drawing Sheets

(51) Int. Cl.
*B60W 10/02* (2006.01)
*B60W 10/08* (2006.01)
*B60W 10/10* (2012.01)
*F16H 59/14* (2006.01)
*F16H 59/42* (2006.01)
*F16H 61/04* (2006.01)
*F16H 57/02* (2012.01)
*F16H 59/36* (2006.01)

(52) U.S. Cl.
CPC ............ *B60W 10/10* (2013.01); *F16H 59/14* (2013.01); *F16H 59/42* (2013.01); *F16H 61/0403* (2013.01); *B60W 2510/0208* (2013.01); *B60W 2510/1015* (2013.01); *B60W 2710/021* (2013.01); *B60W 2710/081* (2013.01); *B60W 2710/083* (2013.01); *B60W 2710/1005* (2013.01); *B60W 2710/1011* (2013.01); *F16H 2057/02034* (2013.01); *F16H 2057/02043* (2013.01); *F16H 2059/366* (2013.01); *F16H 2061/0422* (2013.01)

(56) References Cited

U.S. PATENT DOCUMENTS

2012/0081059 A1    4/2012  Romig
2016/0137205 A1*   5/2016  Bang ................... B60W 10/06
                                                    701/54
2016/0347320 A1    12/2016 Zhu et al.

OTHER PUBLICATIONS

International Search Report and Written Opinion of the International Searching Authority in corresponding International Application No. PCT/EP2021/075678 mailed Dec. 3, 2021 (17 pages).
International Preliminary Report on Patentability in corresponding International Application No. PCT/EP2021/075678 mailed Sep. 9, 2022 (9 pages).

* cited by examiner

CONTROLLING APPARATUS FOR A POWERTRAIN OF AN ELECTRIC VEHICLE

CROSS-REFERENCE TO RELATED APPLICATIONS

This application is a U.S. National Stage application of PCT/EP2021/075678, Sep. 17, 2021 and published on Mar. 24, 2022 as WO 2022/058532, which claims the benefit of European Patent Application No. 20196922.7, filed Sep. 18, 2020, all of which are hereby incorporated by reference in their entireties.

TECHNICAL FIELD

The present invention relates to a controlling apparatus for a powertrain of an electric vehicle. The invention further relates to powertrain, a method for controlling the speed of electric machines in a powertrain of an electric vehicle, and to an electric vehicle.

BACKGROUND

A vehicle typically comprises an engine for propelling the vehicle. The engine may be powered by various means, such as e.g. by a liquid or gaseous fuel in an internal combustion engine, or by electric power in an electric machine or motor. Moreover, hybrid solutions exist in which e.g. the vehicle is propelled both by an internal combustion engine and an electric machine. In either way, a battery is used to power the electric machine. The battery, and any reservoir with liquid or gaseous fuel, may commonly be referred to as an energy storage.

In a vehicle, the engine is part of a powertrain which transform energy from the energy storage to the propelling means, typically the wheels of the vehicle. For this purpose, the powertrain further comprises transmission and drive shafts. In order to control the operation of the engine, and any related actions such as e.g. gear shifting operations, the vehicle comprises a controlling apparatus and/or control unit. For example, in a vehicle comprising an electric machine, at least a part of the controlling apparatus is the electric machine driver, arranged and configured to control the operation of the electric machine.

U.S. Ser. No. 10/744,889B1 discloses a control apparatus and method for a two motor drive system of an electric vehicle. According to the abstract of U.S. Ser. No. 10/744,889B1, a spline connects the two motors, and a second spline connects a motor to a transmission, wherein the control apparatus is configured to in positive driving traction, initiate torque change of the first motor and delay torque change of the second motor, in negative driving traction, initiate torque change of the second motor and delay torque change of the first motor, in downshift of the transmission, initiate torque change of the first motor and delay torque change of the second motor, and in upshift of the transmission, initiate torque change of the second motor and delay torque change of the first motor.

For hybrid vehicles, or other type of electric vehicles, comprising at least two engines or electric machines, the control of the corresponding powertrain can become complex, as the multiple engines or electric machines need to cooperate in various operations of the vehicle. Thus, there is a need in the industry for an improved control of the powertrain, in particular during gear shifting operations.

SUMMARY

It is an object of the present invention to at least to some extent alleviate the shortcomings discussed above in relation to known gear shifting operations, and to improve the control of the speed of the different electric machines.

According to at least a first aspect of the present invention, a controlling apparatus for a powertrain of an electric vehicle comprising a gearbox having an input shaft, a first electric machine and a second electric machine, each one of the first and second electric machines being coupled to the input shaft of the gearbox, is provided. The controlling apparatus is configured to control the operation of the first and second electric machines, and to perform at least a part of a gear shifting operation by the steps of:

changing the speed of the first and second electric machines to reach a target speed of the input shaft;
determining that the speed of the input shaft is within a target range of the target speed;
setting one of the first and second electric machines in a first control mode, the first control mode being speed control to adjust for changes so that the target speed of the input shaft can be kept when reached, and setting the other one of the first and second electric machines in a second control mode being different to the first control mode, in response of determining that the speed of the input shaft is within the target range.

Hereby, an initial phase where the target speed is roughly reached (i.e. when the speed of the input shaft is within the target range) is followed by precise control of the speed, enabling improved control and accuracy as well as improved speed synchronisation between the first and second electric machines. Moreover, the first and the second electric machines will not interfere much with each other, as not both of them are trying to precisely control the speed of the input shaft. Hereby, also unwanted rattling noise otherwise caused by the interfering first and second electric machines is reduced or avoided. Thus, by setting the first and the second electric machines in different control modes once the speed of the input shaft is within a target range, precise control of the speed, enabling improved control and accuracy as well as improved speed synchronisation between the first and second electric machines, is provided.

According to at least one example embodiment, the second control mode is torque control. For example, the other one of the first and second electric machines is set in torque control to follow the speed of the input shaft, or substantially follow the speed of the input shaft, in response of determining that the speed of the input shaft is within the target range.

It should be understood that when stating that the torque control is used to enable "to follow the speed of the input shaft" or "to substantially follow the speed of the input shaft", the corresponding electric machine is not contributing, or at least not significantly contributing, in driving the input shaft. In other words, for the embodiments in which the electric machine is operated in torque control, subsequent to determining that the speed of the input shaft is within the target range, is not transferring any (significant) torque to the input shaft. Thus, the torque transfer of the electric machine in torque control may be set to zero, or almost zero. Alternatively, the torque transfer of the electric machine in torque control is set to a constant low value, e.g. 10% of the overall transferred torque to the input shaft, or lower than 10% of the overall transferred torque to the input shaft. According to at least one example embodiment, the electric machine being operated in torque control, subsequent to determining that the speed of the input shaft is within the target range, is contributing with less than 10%, or less than 5% or less than 1% compared to the electric machine being operated in speed control.

It should be understood that the input shaft of the gearbox is any shaft of the gearbox adapted to receive torque from the electric machines during a driving operation of the electric machines (i.e. when the electric machines operates as a motor to e.g. propel the vehicle). The input shaft may e.g. be a lay shaft or a countershaft. Thus, the input shaft is different from an output shaft or a drive shaft, the latter being configured to transfer torque from the gearbox to a drive arrangement or drive unit, such as e.g. a wheel of a vehicle. Thus, the input shaft may be referred to as the input shaft, or input shafts.

It should be understood that during the operational step of the controlling apparatus in changing the speed of the first and second electric machines to reach a target speed of the input shaft, the target speed is typically not reached, but that the first and second electric machines are operated with a changing speed in a direction to reach the target speed of the input shaft. In other words, changing the speed of the first and second electric machines towards the desire of reaching the target speed of the input shaft.

The step of determining that the speed of the input shaft is within a target range of the target speed may be achieved by various measures, such as e.g. determining the speed or acceleration, or any derivates thereof, possibly in combination with a lapsed time. However, it should be noted, as the speed of the input shaft is within a target range of the target speed, e.g. within 15% or within 10%, or within 5% of the target speed, one of the first and second electric machines is set in the first control mode being speed control, and the other one of the first and second electric machines is set in the second control mode being different to the first control mode, and e.g. being torque control. According to at least one example embodiment, the target speed of the input shaft will be reached and kept by the electric machine operated in speed control. After the target speed of the input shaft has been reached, the speed control of the electric machine is configured to operate the corresponding electric machine so that the target speed of the input shaft is kept within a tolerance range.

According to at least one example embodiment, the target speed is comprised in a target range being a first speed range of the input shaft. Thus, stated differently, the method comprises: changing the speed of the first and second electric machines, from a respective speed corresponding to a speed of the input shaft in a second speed range being different to the first speed range, to reach the first speed range of the input shaft; determining that the speed of the input shaft is within said first speed range; in response of determining that the speed of the input shaft is within said first speed range, setting one of the first and second electric machines in a first control mode, the first control mode being speed control to adjust for changes so that the target speed within the first speed range of the input shaft can be kept when reached, and setting the other one of the first and second electric machines in a second control mode being different to the first control mode. The first speed range may e.g. extend from −15% to +15% of the target speed, or extend from −10% to +10% of the target speed, or extend from −5% to +5% of the target speed.

According to at least one example embodiment, in the step of changing the speed of the first and second electric machines to reach a target speed of the input shaft, the speed is changed by accelerating or decelerating (braking) the first and second electric machines, whatever is needed, or being most efficient, for reaching the target speed of the input shaft.

According to at least one example embodiment, the part of the gear shifting operating performed by the controlling apparatus is referred to as a speed synchronization of the first and second electric machines. However, the operation of the controlling apparatus as specified above may be initiated by a gear shifting step, wherein the controlling apparatus is configured to recognize such gear shifting step and to determine the target speed of the input shaft corresponding to the new gear. In other words, the controlling apparatus may be configured to:
  detect a gear shifting operation for which the input shaft of the gearbox has a target speed,
  determining whether or not the speed of the first and second electric machines need to change, and if so, if the first and second electric machines need to accelerate or decelerate,
  changing the speed of the first and second electric machines in response to determining that the speed of the first and second electric machines need to change, either by accelerating or decelerating the first and the second electric machine, depending on target speed.

According to at least one example embodiment, the controlling apparatus is further configured to apply a braking or accelerating torque to the first electric machine and/or the second electric machine, in response of determining that the speed of the input shaft is within the target range.

Hereby, a transferring mode enabling a smooth transition into the new speed of the first and/or second electric machine is provided. Thus, the target speed of the input shaft can be reached in a smoother manner.

According to at least one example embodiment, one of the first and second electric machines is set in speed control to adjust for changes so that the target speed of the input shaft can be kept when reached, in response of determining that the speed of the input shaft is within the target range, when an acceleration of the particular electric machine is needed, and another electric machine is set in speed control to adjust for changes so that the target speed of the input shaft can be kept when reached, in response of determining that the speed of the input shaft is within the target range, when a deceleration of the particular electric machine is needed.

According to at least one example embodiment, the controlling apparatus comprises a first machine driver configured to control the operation of the first electric machine, and a second machine driver configured to control the operation of the second electric machine, wherein each one of the first and second machine drivers comprises a torque controller and/or a speed controller.

Thus, at least the respective machine driver is arranged and configured to operate the corresponding electric machine. According to at least one example embodiment, the controlling apparatus comprises a control unit, such as e.g. a central control unit, and the first and second machine drivers.

According to at least one example embodiment, the controlling apparatus is further configured to perform the gear shifting operation by the steps of:
  prior to the step of changing the speed of the first and second electric machines to reach a target speed of the input shaft, disengage the gearbox, and
  subsequent to reaching the target speed of the input shaft, engaging the gearbox.

Hereby, the steps of adapting the respective speed of the first and second electric machines, and setting the same in the first and second control mode e.g. speed control and torque control, may be carried out during a disengagement of the gearbox. In other words, the target speed of the input shaft can be reached before engaging the gearbox. That is, the speed of the input shaft is kept while engaging the gear.

Typically, the engagement and disengagement of the gearbox is in relation to the remaining drive arrangement, such as e.g. drive shafts arranged downstream of the gearbox.

According to at least one example embodiment, the gearbox is a staged gearbox. According to at least one example embodiment, a clutch is arranged between the first electric machine and the input shaft of the gearbox, between the second electric machine and the input shaft of the gearbox, internally of the gearbox, and/or between the gearbox and the drive arrangement or drive shafts.

According to at least one example embodiment, the second control mode is torque control or speed control different to the speed control of the first control mode.

For example, the second control mode is speed control with another parameter setting than the speed control in the first control mode.

According to at least one example embodiment, in which the second control mode is torque control, the torque control is adapted to apply a braking force or an acceleration to the input shaft. For example, if the torque control is set to a negative value, the implication of the torque control is a braking effect, and if the torque control is set to positive value, the implication of the torque control is an accelerating effect. For example, the torque control is set to be between −10% of the reference torque and +10% of the reference torque. The reference torque is typically equal to the maximal torque of the electric machine. According to at least one example embodiment, the torque control is set to be between −5% of the reference torque and +5% of the reference torque, or is set to be between −3% of the reference torque and +3% of the reference torque.

According to at least one example embodiment, the second control mode is speed control different to the speed control of the first control mode, and wherein the speed control regulation of the second control mode is weaker compared to the speed control regulation in the first control mode.

Thus, even though both of the first and second electric machines are operated in speed control, the first and the second electric machines will not interfere much with each other, as not both of them are trying to precisely control the speed of the input shaft. For example, the speed control regulation of the second control mode is lower than 10% of the speed control regulation of the first control mode, or is lower than 5% of the speed control regulation of the first control mode, or is lower than 1% of the speed control regulation of the first control mode.

According to at least one example embodiment, the second control mode is torque control, and wherein the torque control is set to be −0.1% or lower of the reference torque.

Thus, the second control mode is adapted to apply a braking force to the input shaft. Hereby, undesired noise may be reduced. For example, noise stemming from the input shaft may be reduced. The torque control may be set to be −3% or lower of reference torque, or may be set to −5% or lower of the reference torque, or may be set as −10% or lower of the reference torque. For example, the torque control is set to be between −0.1% and −10% of the reference torque.

According to at least a second aspect of the invention, a powertrain of an electric vehicle is provided. The powertrain comprises the controlling apparatus of the first aspect of the invention, and a gearbox having an input shaft, a first electric machine and a second electric machine, each one of the first and second electric machines being coupled to the input shaft of the gearbox.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to at least one example embodiment, the first electric machine and the second electric machine is directly coupled to the input shaft of the gearbox.

According to at least one example embodiment, the first electric machine comprises a first machine output shaft coupled to the input shaft of the gearbox, and the second electric machine comprises a second machine output shaft coupled to the input shaft of the gearbox, the second machine output shaft being arranged in parallel to the first machine output shaft such that each one of the first and second electric machines separately drives the input shaft.

Thus, each one of the first and second electric machines may directly drive the input shaft of the gearbox.

According to at least one example embodiment, the powertrain further comprises a third electric machine being coupled to the input shaft of the gearbox, wherein the controlling apparatus is configured to control the operation of third electric machine, and setting the third electric machine in a third control mode, the third control mode being different to the first control mode, in response of determining that the speed of the input shaft is within the target range.

Thus, the third electric machine is operated in a corresponding manner as the first or second electric machine being operated in the second control mode (e.g. torque control) in response of determining that the speed of the input shaft is within the target range. The third control mode may the same as the second control mode, or it may be different to the second control mode. The third control mode may be torque control or speed control different to the speed control of the first control mode.

The third electric machine is preferably arranged in parallel to the first and second electric machines, and is thus arranged and configured to separately, and/or directly, drive the input shaft.

According to at least a third aspect of the present invention, a method for controlling the speed of electric machines in a powertrain of an electric vehicle during a gear shifting operation is provided. The electric vehicle comprises a gearbox having an input shaft, a first electric machine and a second electric machine, each one of the first and second electric machines being coupled to the input shaft of the gearbox. The method comprises the steps of:

changing the speed of the first and second electric machines to reach a target speed of the input shaft;
determining that the speed of the input shaft is within a target range of the target speed;
setting one of the first and second electric machines in a first control mode, the first control mode being speed control to adjust for changes so that the target speed of the input shaft can be kept when reached, and setting the other one of the first and second electric machines in a second control mode being different to the first control mode, in response of determining that the speed of the input shaft is within the target range.

Effects and features of the third aspect of the invention are largely analogous to those described above in connection with the first and second aspects of the invention. Embodiments mentioned in relation to the first and second aspects of the invention are largely compatible with the third aspect of the invention, of which some are exemplified below (typically without repeating any advantageous effects).

According to at least one example embodiment, the second control mode is torque control or speed control different to the speed control of the first control mode.

According to at least one example embodiment, the method comprises the step of applying a braking or accelerating torque to the first electric machine and/or to the second electric machine, in response of determining that the speed of the input shaft is within the target range.

According to at least one example embodiment, the method further comprises the step of independently controlling the operation of the first and second electric machines by means of machine drivers.

According to at least one example embodiment, the method further comprises the steps of:
prior to the step of changing the speed of the first and second electric machines to reach a target speed of the input shaft, disengage the gearbox, and
subsequent to reaching the target speed of the input shaft, engaging the gearbox.

According to at least one example embodiment, the first electric machine comprises a first machine output shaft coupled to the input shaft of the gearbox, and the second electric machine comprises a second machine output shaft couple to the input shaft of the gearbox, the second machine output shaft being arranged in parallel to the first machine output shaft, and the method further comprising the step of operating the first and second electric machines to separately drive the input shaft.

According to at least one example embodiment, the electric vehicle further comprises a third electric machine being coupled to the input shaft of the gearbox, and the method further comprises the step of setting the third electric machine in a third control mode, the third control mode being different to the first control mode (the third control mode being e.g. torque control), in response of determining that the speed of the input shaft is within the target range. The third electric machine being described in relation to the second aspect of the invention.

According to at least a fourth aspect of the invention, an electric vehicle is provided. The electric vehicle comprises a controlling apparatus according to the first aspect of the present invention, or a powertrain according to the second aspect of the invention. The electric vehicle may e.g. be a hybrid vehicle or a full-electric vehicle, such as a plug-in electric vehicle.

Effects and features of this fourth aspect of the invention are largely analogous to those described above in connection with the first and second aspects of the invention. Embodiments mentioned in relation to the first and second aspects of the invention are largely compatible with the fourth aspect of the invention.

According to at least a fifth aspect of the present invention, a computer program comprising program code means for performing the method, or method steps of the third aspect of the invention, when the program is run on a computer is provided.

According to at least a sixth aspect of the present invention, a computer readable medium carrying a computer program comprising program code means for performing the method, or method steps of the third aspect of the invention, when the program is run on a computer is provided.

Further advantages and features of the present invention are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
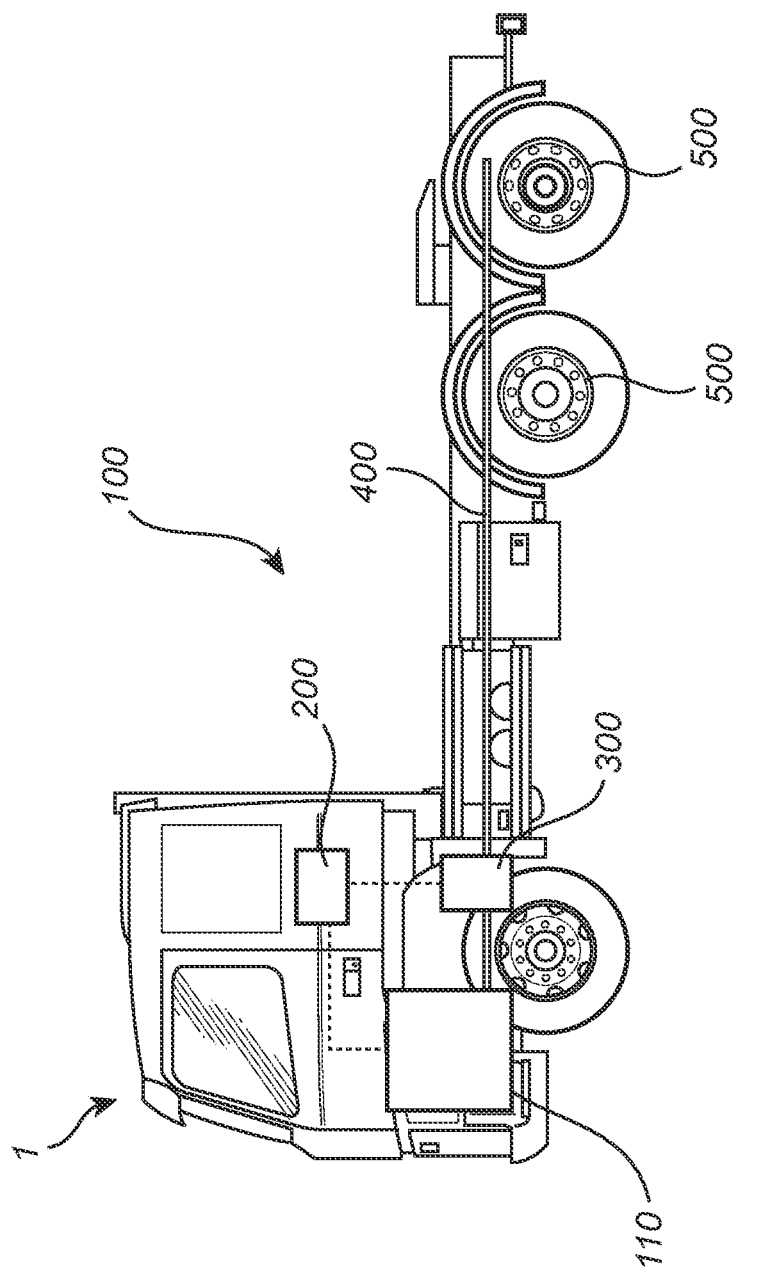
FIG. 1 is a side schematic view of a vehicle comprising a powertrain and a controlling apparatus in accordance with an example embodiment of the invention.

With reference to FIG. 1 a vehicle 1, here embodied as a heavy duty truck 1, is disclosed for which a powertrain 100 with a controlling apparatus 200 of a kind disclosed in the present invention is advantageous. However, the powertrain 100 or controlling apparatus 200 may as well be implemented in other types of vehicles, such as in busses, lightweight trucks, passenger cars, marine applications etc. The vehicle 1 may be an electric vehicle, such as a full electric vehicle or a hybrid, wherein the powertrain 100 comprises an electric driveline 110 comprising a battery and a at least one electric machine powered by the battery (shown in FIG. 2). As seen in FIG. 1, the powertrain 100 may further comprise a transmission 300 comprising at least a gearbox, and drive shafts 400 configured to transfer motion to the drive wheels 500.

Figure 2:
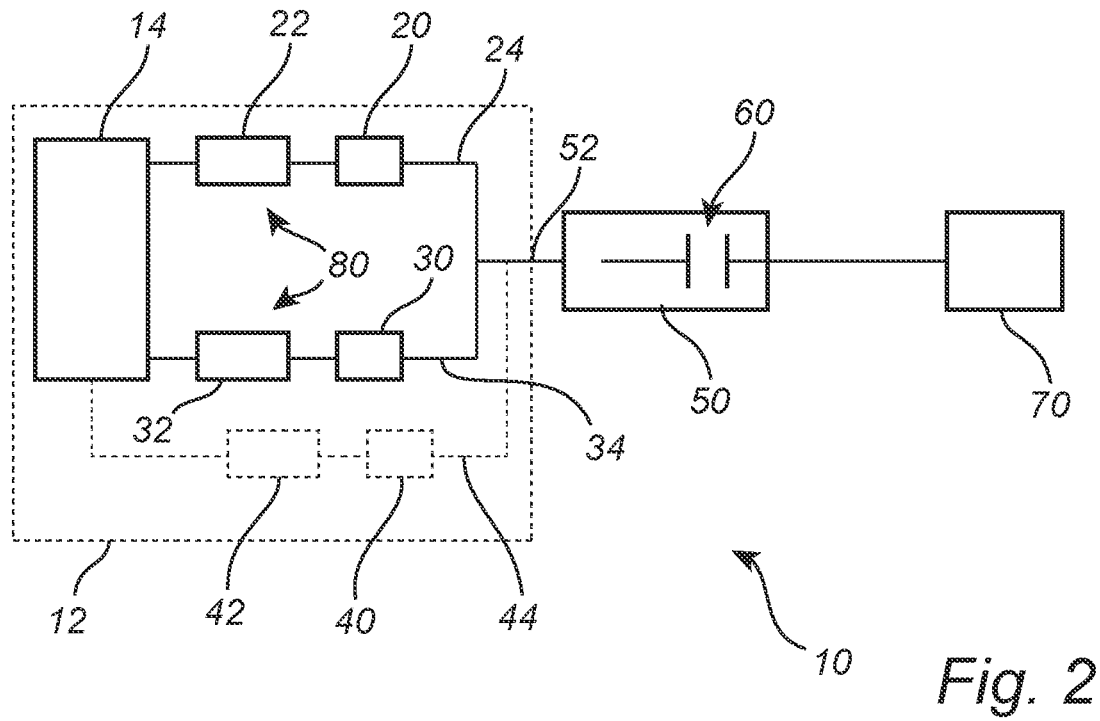
FIG. 2 is a schematic detailed view of a powertrain and a controlling apparatus in accordance with an example embodiment of the invention.

FIG. 2 is a schematic view of a powertrain 10 comprising an electric driveline 12, a gearbox 50 coupled to the electric driveline 12 via an input shaft 52 of the gearbox 50, and a drive arrangement 70 coupled to the gearbox 50 via a clutch 60, the drive arrangement 70 schematically shown as a simple box but intended to include any necessary drive shafts or the like for transferring motion from the gearbox to the drive wheels. The clutch 60 is here a dog clutch arranged internally of the gearbox 50, but may as well be arranged between the gearbox 50 and drive arrangement 70.

The electric driveline 12 comprises a battery 14 powering a first electric machine 20 and a second electric machine 30, each one of the first and second electric machines 20, 30 being coupled to the input shaft 52 of the gearbox 50. As schematically seen in FIG. 2, the first and second electric machines 20, 30 are arranged in a parallel configuration with regards to the input shaft 52 of the gearbox 50. That is, each one of the first and second electric machines 20, 30, is configured to individually drive the input shaft 52. In more detail, the first electric machine comprises a first machine output shaft 24 coupled to the input shaft 52, and the second electric machine 30 comprises a second machine output shaft 34 coupled to the input shaft 52, wherein the first and second machine output shafts 24, 34 are arranged in a parallel configuration, in such a way that each one of the first and second electric machines 20, 30 separately drives the input shaft 52 of the gearbox 50.

As also shown in FIG. 2, the electric drive 12 comprises an optional third electric machine 40 having third machine output shaft 44, shown in dashed lines. The third electric machine 40, and its third machine output shaft 44, are arranged in a parallel configuration to the first and second electric machines 20, 30 and its respective first and second machine output shafts 24, 34, such that the third electric machine 40 may drive the input shaft 52 of the gearbox 50 individually.

Figure 3:
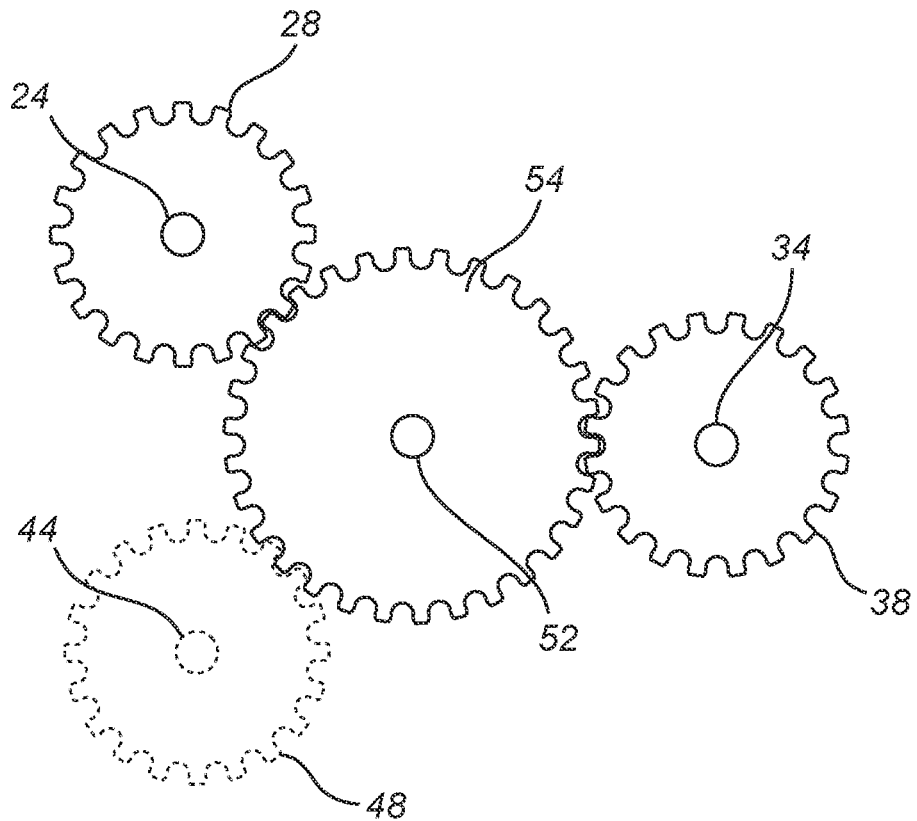
FIG. 3 is a detailed view of a part of the powertrain of FIG. 2, in accordance with another example embodiment of the invention.

The coupling between the first, second and optional third electric machines 20, 30, 40 and the gearbox 50 is shown in greater detail in FIG. 3. The first machine output shaft 24 is configured to drive a first machine ring gear 28, the second machine output shaft 34 is configured to drive a second machine ring gear 38, and the optional third machine output shaft 44 is configured to drive a third machine ring gear 48. Each one of the first, second and third machine ring gears 28, 38, 48 is configured and arranged to individually drive an input shaft ring gear 54, wherein the input shaft ring gear 54 transfers the rotational motion of the first, second and optional third machine output shafts 24, 34, 44 to the input shaft 52 via the first, second and optional third machine ring gears 28, 38, 48.

The operation of the first electric machine 20 is at least partly controlled by means of a first machine driver 22, the operation of the second electric machine 30 is at least partly controlled by means of a second machine driver 32, and the operation of the optional third electric machine 40 is at least partly controlled by means of a third machine driver 42. Each one of the first, second and third machine drivers 22, 32, 42 comprises a torque controller and/or a speed controller. Thus, the operation of the first, second and optional third electric machines 20, 30, 40 is individually controlled by means of respective machine driver 22, 32, 42.

Figure 4:
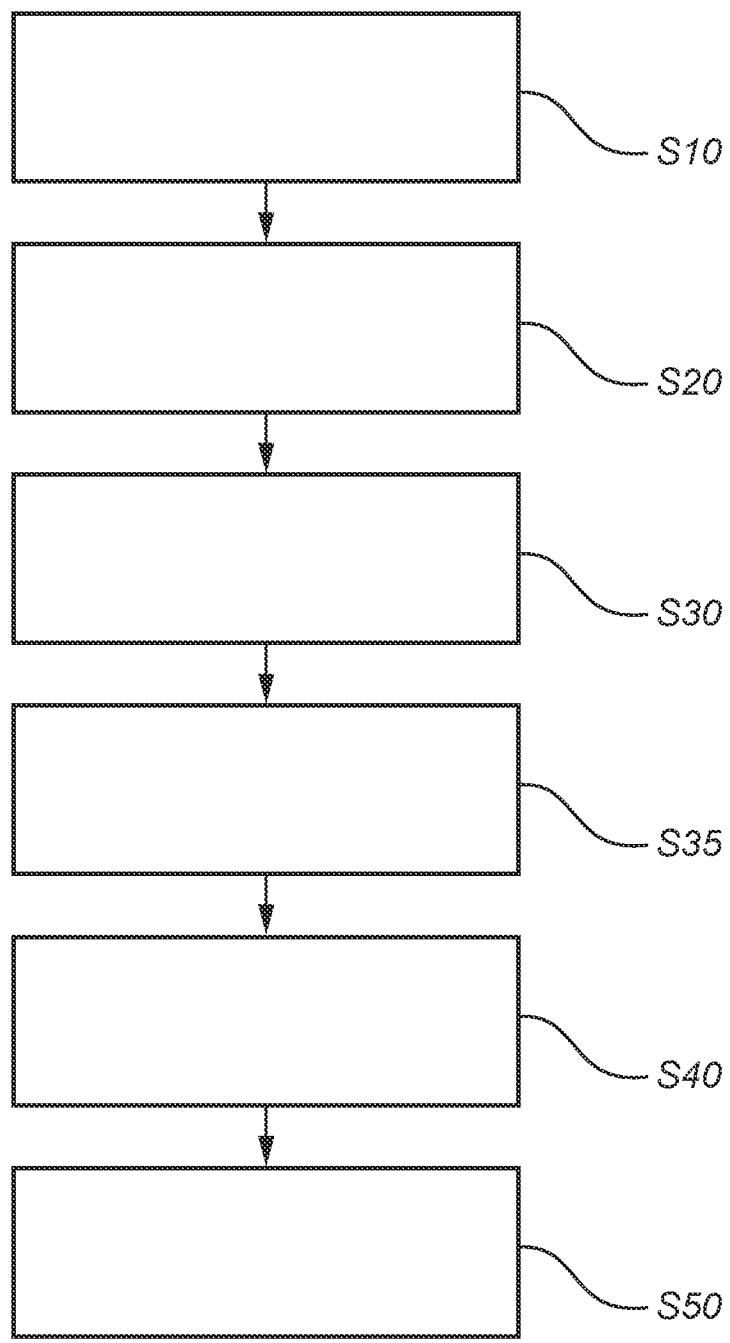
FIG. 4 is a flowchart illustrating the steps of a method in accordance with one example embodiment of the invention.

The first and second, and optional the third machine drivers 22, 32, 42, possibly together with a control unit (as component 200 of FIG. 1), forms a controlling apparatus 80. Thus, the controlling apparatus 80 is configured to control the operation of the first, second and optional third electric machines 20, 30, 40. For example, the controlling apparatus 80 is configured to perform at least a part of a gear shifting operation of the powertrain 10, such as e.g. a speed synchronization action of the first, second and optional third electric machines 20, 30, 40. Such gear shifting operation and speed synchronization action will now be described with additional reference to the flow chart of FIG. 4.

In a step S10, the input shaft 52 of the gearbox 50 is disengaged from the drive arrangement 70 by means of clutch 60. It should be noted that the clutch 60 may be arranged internally of the gearbox 50, e.g. being a clutch between the input shaft 52 and an output shaft of the gearbox 50. The step S10 may e.g. be performed by the controlling apparatus 80, or a separate control unit (e.g. unit 200 of FIG. 1).

In a step S20, the speed of the first, second and optional third electric machines 20, 30, 40 are changed to reach a target speed of the input shaft 52. For example, the initialisation of a gear shifting operation from a first gear to a second gear is typically linked to a needed change in the speed of the input shaft 52 of the gearbox 50. Thus, the second gear (being the target gear in this example) is associated with a target speed of the input shaft 52. Subsequent to disengaging the input shaft 52 from the drive arrangement in step S10, the speed of the first, second and optional third electric machines 20, 30, 40 are thus changed to reach the target speed of the input shaft 52 in step S20.

In a step S30, it is determined that the speed of the input shaft 52 is within a target range of the target speed. In other words, by the step S20, the first, second and optional third electric machines 20, 30, 40 are operated towards a state in which the target speed of the input shaft 52 is reached, and as the target speed is reached within a target range, the new state is determined to be met. It should be noted that the target range may be set very close to the target speed, or be set at the target speed+/−a tolerance value (e.g. +/−15%, or +/−10%, or +/−5%).

In a step S40, one of the first and second electric machines 20, 30 is set to operate in a first control mode being speed control by the corresponding speed controller, in order to adjust for changes so that the target speed of the input shaft 52 can be kept when reached, in response of determining that the speed of the input shaft 52 is within the target range (i.e. from step S40). Moreover, the other one of the first and second electric machines 20, 30 is set to operate in a second control mode being different to the first control mode, e.g. being torque control, by the corresponding machine drive 22, 32 (e.g. being a torque controller or a speed controller), for example to follow or trail the speed of the input shaft 52 with a minimum of torque contribution, in response of determining that the speed of the input shaft 52 is within the target range. Also, the optional third electric machine 40 is set to operate in a third control mode being different to the first control mode (also here e.g. torque control) by the corresponding torque controller, in response of determining that the speed of the input shaft 52 is within the target range.

In a step S50, subsequent to reaching the target speed of the input shaft 52, the input shaft 52 of the gearbox 50 is engaged to the drive arrangement 70 by clutch 60.

It should be understood that the steps S20, S30 and S40 may be referred to as a speed synchronization action of the first, second and optional third electric machines 20, 30, 40, and is preferably performed by the controlling apparatus 80.

Moreover, in a step S35, occurring prior to the step S40, a braking or accelerating torque may be applied to the first, second and/or optional third electric machine 20, 30, 40, in response of determining that the speed of the input shaft 52 is within the target range (i.e. by step S30). Hereby, a smooth transition of the change in speed of the input shaft 52 is provided. Step S35 is preferably performed by the controlling apparatus 80.

It should be noted that the naming of the steps not necessarily, but might according to at least one example embodiment, relate to the order in which the steps are carried out. Thus, the order of the steps may be different than that explained here, and the controlling apparatus 80, 200 may be configured to carry out one or several of the steps.

It should be noted that the controlling apparatus 200 in vehicle 1 of FIG. 1 may be corresponding to the controlling apparatus 80 of FIG. 2 and/or a separate control unit, such as e.g. a central control unit. Moreover, the powertrain 10 of FIG. 2 and the details of FIG. 3 may be implemented in the vehicle 1 instead of powertrain 100.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A controlling apparatus for a powertrain of an electric vehicle, wherein the electric vehicle comprises a gearbox having an input shaft, a first electric machine and a second electric machine, each one of the first and second electric machines being coupled to the input shaft of the gearbox, the controlling apparatus being configured to control operation of the first and second electric machines, and to perform at least a part of a gear shifting operation by the steps of:

changing a speed of the first and second electric machines to reach a target speed of the input shaft;
determining that a speed of the input shaft is within a target range of the target speed;
setting one of the first and second electric machines in a first control mode, the first control mode being speed control to adjust for changes so that the target speed of the input shaft can be kept when reached, and setting the other one of the first and second electric machines in a second control mode being different to the first control mode, in response of determining that the speed of the input shaft is within the target range.

2. The controlling apparatus according to claim 1, being further configured to apply a braking or accelerating torque to the first electric machine and/or the second electric machine, in response of determining that the speed of the input shaft is within the target range.

3. The controlling apparatus according to claim 1, comprising a first machine driver configured to control the operation of the first electric machine, and a second machine driver configured to control the operation of the second electric machine, wherein each one of the first and second machine drivers comprises a torque controller and/or a speed controller.

4. The controlling apparatus according to claim 1, wherein the controlling apparatus is further configured to perform the gear shifting operation by the steps of:

prior to the step of changing the speed of the first and second electric machines to reach a target speed of the input shaft, disengage the gearbox, and
subsequent to reaching the target speed of the input shaft, engaging the gearbox.

5. The controlling apparatus according to claim 1, wherein the second control mode is torque control or speed control different to the speed control of the first control mode.

6. The controlling apparatus according to claim 5, wherein the second control mode is speed control different to the speed control of the first control mode, and wherein speed control regulation of the second control mode is lower than 10% of the speed control of the first control mode.

7. The controlling apparatus according to claim 5, wherein the second control mode is torque control, and wherein the torque control is set to be between −10% of a reference torque and +10% of the reference torque, the reference torque being equal to a maximal torque of the electric machine, and wherein a negative value of the torque control relative to the reference torque implies a braking effect, and a positive value of the torque control relative to the reference torque implies an accelerating effect.

8. A powertrain of an electric vehicle comprising the controlling apparatus of claim 1.

9. The powertrain according to claim 8, wherein the first electric machine comprises a first machine output shaft coupled to the input shaft of the gearbox, and the second electric machine comprises a second machine output shaft coupled to the input shaft of the gearbox, the second machine output shaft being arranged in parallel to the first machine output shaft such that each one of the first and second electric machines separately drives the input shaft.

10. The powertrain according to claim 8, further comprising a third electric machine being coupled to the input shaft of the gearbox, wherein the controlling apparatus is configured to control the operation of the third electric machine, and setting the third electric machine in a third control mode, the third control mode being different to the first control mode, in response of determining that the speed of the input shaft is within the target range.

11. A method for controlling speed of electric machines in a powertrain of an electric vehicle during a gear shifting operation, wherein the electric vehicle comprises a gearbox having an input shaft, a first electric machine and a second electric machine, each one of the first and second electric machines being coupled to the input shaft of the gearbox, the method comprising:

changing a speed of the first and second electric machines to reach a target speed of the input shaft;
determining that a speed of the input shaft is within a target range of the target speed;
setting one of the first and second electric machines in a first control mode, the first control mode being speed control to adjust for changes so that the target speed of the input shaft can be kept when reached, and setting the other one of the first and second electric machines in a second control mode being different to the first control mode, in response of determining that the speed of the input shaft is within the target range.

12. The method according to claim 11, further comprising: applying a braking or accelerating torque to the first electric machine and/or to the second electric machine, in response of determining that the speed of the input shaft is within the target range.

13. The method according to claim 11, further comprising independently controlling operation of the first and second electric machines by means of machine drivers.

14. The method according to claim 11, further comprising:

prior to changing the speed of the first and second electric machines to reach a target speed of the input shaft, disengage the gearbox, and
subsequent to reaching the target speed of the input shaft, engaging the gearbox.

15. The method according to claim 11, wherein the first electric machine comprises a first machine output shaft coupled to the input shaft of the gearbox, and the second electric machine comprises a second machine output shaft coupled to the input shaft of the gearbox, the second machine output shaft being arranged in parallel to the first machine output shaft, the method further comprising: operating the first and second electric machines to separately drive the input shaft.

16. The method according to claim 11, wherein the electric vehicle further comprises a third electric machine being coupled to the input shaft of the gearbox, the method further comprising: setting the third electric machine in a third control mode, the third control mode being different to the first control mode, in response of determining that the speed of the input shaft is within the target range.

17. The method according to claim 11, wherein the second control mode is torque control or speed control different to the speed control of the first control mode.

18. An electric vehicle comprising a controlling apparatus according to claim 1.

19. A non-transitory computer readable medium carrying a computer program comprising program code for performing the method according to claim 11, when the program code is run on a computer.

* * * * *